United States Patent [19]

Hiramatsu

[11] Patent Number: 4,881,626

[45] Date of Patent: Nov. 21, 1989

[54] POWER TRANSMISSION APPARATUS FOR VEHICLE OF FOUR-WHEEL DRIVE TYPE

[75] Inventor: Takeo Hiramatsu, Nagaokakyo, Japan

[73] Assignee: Mitsubishi Jidosha Kogyo Kabushiki Kaisha, Japan

[21] Appl. No.: 302,037

[22] Filed: Jan. 24, 1989

Related U.S. Application Data

[63] Continuation of Ser. No. 88,059, Aug. 21, 1987, abandoned.

[30] Foreign Application Priority Data

Sep. 1, 1986 [JP] Japan ............................ 61-205300

[51] Int. Cl.$^4$ .................................................. F16D 31/02
[52] U.S. Cl. .......................................... 192/60; 180/248
[58] Field of Search ................ 74/687, 710, 711, 718, 74/655; 180/248, 249; 192/60; 91/491

[56] References Cited

U.S. PATENT DOCUMENTS

| | | | |
|---|---|---|---|
| Re. 28,324 | 1/1975 | Greene | 180/248 |
| 2,595,479 | 5/1952 | Nelson | 192/60 |
| 3,272,276 | 9/1966 | Budzich | 180/248 |
| 3,447,619 | 6/1969 | Nodwell et al. | 180/248 |
| 3,680,652 | 8/1972 | Greene | 180/248 |
| 4,272,993 | 6/1981 | Kopich | 74/711 |
| 4,541,503 | 9/1985 | Akutagawa et al. | 180/249 |
| 4,572,318 | 2/1986 | Cady | 180/248 |
| 4,618,022 | 10/1986 | Hayashi | 180/248 |
| 4,676,336 | 6/1987 | Hiramatsu et al. | 180/248 |

FOREIGN PATENT DOCUMENTS

| | | | |
|---|---|---|---|
| 116524 | of 1985 | Japan . | |
| 116525 | of 1985 | Japan . | |
| 0626239 | 11/1978 | U.S.S.R. | 91/491 |

Primary Examiner—Dirk Wright
Attorney, Agent, or Firm—Abelman Frayne Rezac & Schwab

[57] ABSTRACT

A power transmission apparatus for a four-wheel drive vehicle has a first rotary shaft for transmitting drive force to front wheels of the vehicle, a second rotary shaft for transmitting drive force to rear wheels of the vehicle, and a hydraulic pump connecting the first and second rotary shafts and driven by a difference in rotational speed between the first and second rotary shafts to deliver hydraulic oil in an amount depending on the difference in rotational speed. A suction passage and a delivery passage is changed over in dependence on relative rotational direction of the first and second rotary shafts. An expansion chamber communicates with the suction passages and delivery through a restriction to temporarily suppress an increase in pressure of hydraulic oil delivered from the hydraulic pump, thereby suppressing transmission of a drive force by the hydraulic pump when the variation in relative rotation speed between the first and second rotary shafts is small.

2 Claims, 3 Drawing Sheets

POWER TRANSMISSION APPARATUS FOR VEHICLE OF FOUR-WHEEL DRIVE TYPE

This application is a continuation of application Ser. No. 088,059, filed Aug. 21, 1987.

FIELD OF THE INVENTION

This invention relates to a power transmission apparatus for a vehicle of the kind in which its front and rear wheels are driven by the same engine.

BACKGROUND OF THE INVENTION

In Japanese Pat. Publications Laid-open Nos. 116524/1985 and 116525/1985, there has already been disclosed a power transmission apparatus in which front wheels (or rear wheels) are directly driven by an engine, and a drive force is transmitted to rear wheels (or front wheels) through a coupling comprising a hydraulic oil pump. In the disclosed power transmission apparatus, when a difference in rotation speed occurs between a rotary shaft transmitting the drive force to the front wheels and that transmitting the drive force to the rear wheels, a drive force corresponding to the rotation speed difference is transmitted to the rear wheels by a static oil pressure of the hydraulic oil pump, thereby automatically obtaining a four-wheel drive condition in which the front and rear wheels are driven.

In such a power transmission apparatus, pressure of hydraulic oil delivered from the hydraulic oil pump is controlled to obtain a drive force transmitted to the rear wheels (or front wheels) matching the running conditions of the vehicle.

In the power transmission apparatus of a type in which the drive force is transmitted by the static pressure of the hydraulic oil pump to the rear wheels, the drive force is transmitted to the rear wheels in dependence on a relative difference in rotation speed between the drive shaft transmitting the drive force to the front wheels and that transmitting the drive force to the rear wheels. Therefore, when the vehicle is running at a constant speed in which the drive force is directly transmitted from the engine to the front wheels, the rotary shaft for the rear wheels rotates at the same rotation speed as the rotary shaft for the front wheels, and a floating condition occurs in which no drive force is transmitted to the rear wheels. In such a case, if a change in rotation speed is transmitted to a front wheel drive system due to a change in torque of the engine or the like, there occurs a difference in rotation speed between the rotary shafts for the front and rear wheels, a change in torque according to the change in rotation speed of the front wheels drive system is transmitted through the hydraulic oil pump to a rear wheel drive system, and unusual noises such as a hammering noise associated with the change in torque can occur in the rear wheel drive system, which will considerably impair the durability of the rear wheel drive system.

SUMMARY OF THE INVENTION

With a view to obviate all of the conventional art defects of power transmission apparatus which is applied to a vehicle of the kind having its front and rear wheels driven by the same engine, it is a primary object of the present invention to provide a power transmission apparatus for a vehicle of four-wheel drive type in which a change in rotation speed of the driving side is not transmitted to the driven side, thereby preventing occurrence of unusual noises and improving the durability of the drive systems.

In accordance with the present invention which attains the above object, there is provided a power transmission apparatus for a vehicle of four-wheel drive type comprising a first rotary shaft for transmitting drive force to front wheels, a second rotary shaft for transmitting drive force to rear wheels, a hydraulic oil pump used as connecting means for connecting the first and second rotary shafts, which is driven by a difference in rotation speed between the first and second rotary shafts to deliver hydraulic oil of an amount depending on the rotation speed difference and has a suction passage and a delivery passage which are changed over according to the relative rotational direction of the first and second rotary shafts, restricting means for restricting pressure of hydraulic oil delivered from the hydraulic oil pump, and an expansion chamber connected to the suction passage and delivery passage for reserving hydraulic oil to temporarily suppress increase in pressure of hydraulic oil delivered from the hydraulic oil pump.

When a difference in rotation speed occurs between the first and second rotary shafts and hydraulic oil is delivered from the hydraulic oil pump, the hydraulic oil is temporarily reserved in the expansion chamber to suppress increase in pressure of hydraulic oil temporarily.

As a result, the drive force is not transmitted for a short period of time until the expansion chamber is filled with hydraulic oil, and if the rear wheel drive system is in a floating state and a small variation in rotation speed occurs in the first rotary shaft, the variation in rotation speed is absorbed by the function of the expansion chamber and not transmitted to the second rotary shaft, thereby preventing occurrence of unusual noises such as a hammering noise in the rear wheel drive system and improving the durability of the rear wheel drive system.

DESCRIPTION OF THE PREFERRED EMBODIMENT

Figure 1:
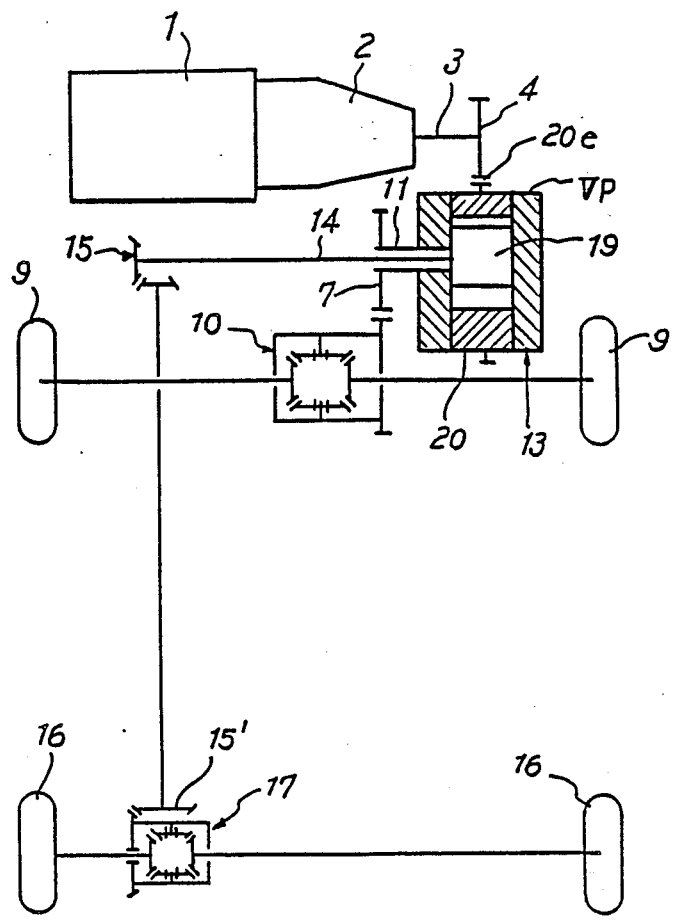
FIG. 1 is a schematic view showing the structure of the power transmission apparatus for a vehicle of four-wheel drive type according to the present invention.

An embodiment of the power transmission apparatus according to the present invention will now be described with reference to FIG. 1 through FIG. 4. FIG. 1 is a schematic view showing the structure of a drive system for a vehicle provided with the power transmission apparatus according to the present invention. Referring to FIG. 1, a transmission mechanism is connected to an engine 1 having a crankshaft extending in the widthwise direction of the vehicle, and an output shaft 3 of the transmission mechanism 2 transmits drive force to a drive gear (or a 4th speed counter gear) 4 mounted thereon. From the drive gear 4, the drive force is transmitted to a cam ring gear 20e of a power transmission apparatus body 13.

The cam ring gear 20e drives a housing 20, and, through a first rotary shaft (an outer shaft) 11 coupled to the housing 20, the drive force is transmitted to a gear 7. From the gear 7, the drive force is transmitted to a differential unit 10 for front wheels 9 to drive the front wheels 9.

That is, the drive force transmitted to the power transmission apparatus body 13 is transmitted intact to the first rotary shaft 11 through the cam ring gear 20e and is transmitted then to the front wheels 9 through the gear 7 and differential unit 10.

The drive force transmitted to the power transmission apparatus body 13 is transmitted also to a second rotary shaft (an inner shaft) 14 disposed in coaxial relation with the first rotary shaft 11. The drive force from the second rotary shaft 14 is transmitted through bevel gear mechanisms 15 and 15', which change the direction of power transmission, to a differential unit 17 for rear wheels to drive the rear wheels 16.

Figure 2:
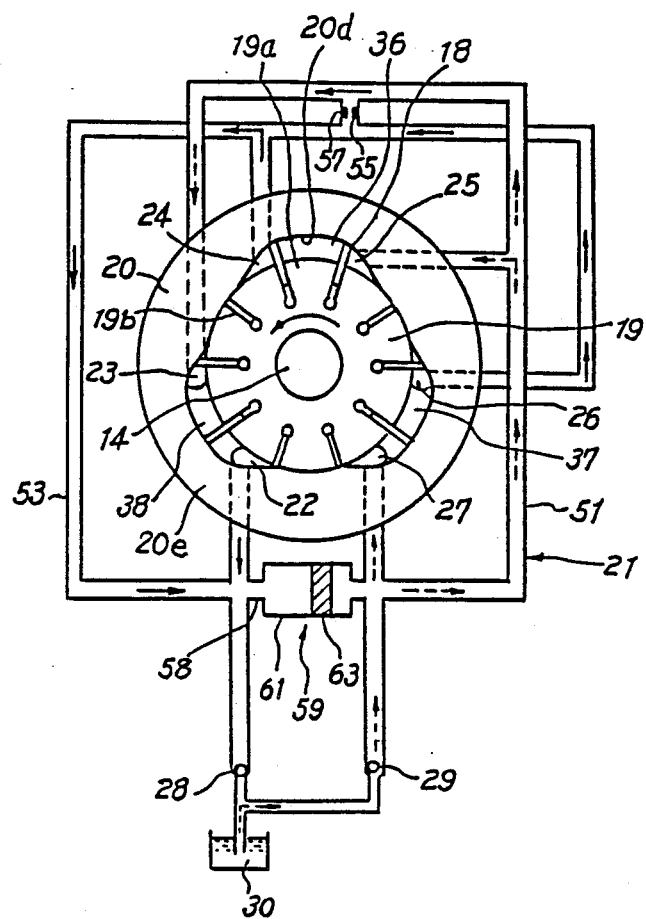
FIG. 2 is a schematic view showing an embodiment of the power transmission apparatus for a vehicle of four-wheel drive type according to the present invention.

As shown in FIG. 2, the power transmission apparatus body 13 for the vehicle of four-wheel drive type comprises a vane pump VP as a hydraulic oil pump and an associated hydraulic control circuit 21. A rotor 19 of the vane pump VP is coupled to the second rotary shaft 14 transmitting the drive force to the rear wheels 16. A cam ring 20e constitutes the housing 20 of the vane pump VP coupled to the first rotary shaft 11 transmitting the drive force to the front wheels 9. As shown in FIG. 2, the vane pump VP which functions as a hydraulic oil pump has a plurality of vane grooves 19b (10 vane grooves in this embodiment) formed in equally circumferentially spaced apart relation in an outer peripheral surface 19a of its rotor 19. In each of the vane grooves 19b, a vane 18 is inserted so as to make sliding contact with an inner peripheral surface 20d of the cam ring 20.

Three pump chambers 36, 37, and 38 are formed between the cam ring 20e and the rotor 19 of the vane pump VP in a relation 120° spaced apart from each other around the centerline of rotation. Also, six ports 22, 23, 24, 25, 26, and 27, which act as suction ports when located on the trailing side in the direction of rotation but act as delivery ports when located on the leading side, are formed in a relation spaced apart by about 60° from each other respectively.

The hydraulic control circuit 21 has a suction passage 51 and a delivery passage 53. The suction passage 51 makes communication of the suction ports 23, 25, and 27 shown in FIG. 2 with each other, and connects these suction ports 23, 25, and 27 to an oil reservoir 30.

The delivery passage 53 makes communication of the suction ports 24, 25, and 26 shown in FIG. 2 with each other, and connects these suction ports 24, 25, and 26 to the oil reservoir 30. Check valves 29 and 28 which permit flow from the oil reservoir 30 only are disposed at connections of the suction passage 51 and the delivery passage 53 to the oil reservoir 30.

The suction passage 51 and the delivery passage 53 communicate with each other through an oil path 55, and the oil path 55 is provided with an orifice 57 which restricts oil flow between the delivery passage 53 and the suction passage 51.

Further, the suction passage 51 and the delivery passage 53 communicate with each other through an oil path 58, and the oil path 58 is provided with a free piston 59 as an expansion chamber. The free piston 59 comprises a cylinder 61 of which both ends are connected to the suction passage 51 and the delivery passage 53, respectively, and a piston 63 sliding inside the cylinder 61, and the piston 63 is moved by a hydraulic oil pressure generated in the delivery passage 53.

When the suction passage 51 acts as a delivery passage, the piston 63 is moved in the reverse direction.

Operation of the above-described arrangement will now be described. In the usual straightforward running state of the vehicle, there is little slip rotation at the front wheels 9 and the rear wheels 16 which have the same effective tire radii, and there occurs no rotation speed difference between the first rotary shaft 11 connected to the the power transmission apparatus body 13 for the vehicle of four-wheel drive type and the second rotary shaft 14. Accordingly, no hydraulic oil pressure is generated in the vane pump VP, and no drive force is transmitted to the rear wheels 16. Thus, the vehicle is driven by the front wheels 9 only.

Even in the straightforward running state of the vehicle, when the vehicle accelerates, there usually occurs a slip within approximately 1% at the front wheels 9 to which the drive force is transmitted directly from the engine, a rotation speed difference between the first rotary shaft 11 and the second rotary shaft 14, and the vane pump VP operates. In this case, when the rotor 19 rotates in the direction shown by the arrow in FIG. 2, the ports 23, 25, and 27 of the vane pump VP act as suction ports, and hydraulic oil is sucked from the oil reservoir 30 through the check valves 29, while the ports 22, 24, and 26 act as delivery ports to deliver hydraulic oil through the delivery passage 53 to the orifice 57 disposed in the oil path 55 and the free piston 59 disposed in the oil path 58. Hydraulic oil conducted to the orifice 57 is restricted by the orifice 57 of its rate of flow to the suction passage 51, and a hydraulic oil pressure is generated in the delivery passage 53. By the action of the hydraulic pressure generated in the delivery passage 53 and the pressure-receiving area of the vane 18, the rotor 19 and the cam ring 20e are rotated integrally to transmit the drive force from the rotor 19 to the second rotary shaft 14. Therefore, the rising response of hydraulic oil pressure is flexibly controlled by the restricting action of the orifice 57 and, in turn, the transmission of the drive force to the rear wheels 16 is controlled. Hydraulic oil conducted to the free piston 59 causes the piston 63 of the free piston 59 to slide toward the suction passage 51, thereby temporarily suppressing increase in hydraulic pressure in the delivery passage 53 and retarding the rise of hydraulic pressure temporarily.

When the rotation speed of the front wheels 9 becomes extremely larger than that of the rear wheels 16, for example, when the front wheels slip on a snow-laden road, in a sharp acceleration of the vehicle, or when the rear wheels tend to lock in braking, there occurs a very large rotation speed difference between the first rotary shaft 11 connected to the power transmission apparatus body 13 for the vehicle of four-wheel drive type and the second rotary shaft 14, and a drive force corresponding to the hydraulic oil delivery pressure is transmitted to the rear wheels 16 thereby establishing the four-wheel drive mode. The rotation speed of the front wheels 9 decreases and that of the rear wheels 16 increases, thus decreasing the rotation speed difference between the wheels (same as the function of a non-slip differential gear mechanism).

Thus, when the front wheels 9 slip, the drive torque to the rear wheels 16 is increased to avoid running inability, and when the rear wheels 16 tend to lock, the braking torque of the front wheels 9 is increased to prevent the rear wheels 16 from locking.

When the rotation speed of the rear wheels 16 becomes extremely larger than that of the front wheels 9, for example, when the front wheels 9 tend to be locked in braking, there occurs a very large rotation speed difference between the first rotary shaft 11 connected to the power transmission apparatus body 13 for the vehicle of four-wheel drive type and the second rotary shaft 14. In such a case, in the vane pump VP, as shown in FIG. 2, ports 22, 24, and 26 act as suction ports and hydraulic oil is sucked from the oil reservoir 30 through the check valve 28, and ports 23, 25, and 27 act as delivery ports to supply hydraulic oil through the delivery passage 53, and hydraulic oil is supplied through the suction passage 51. The hydraulic acid is also conducted to the orifice 57 of the oil path 55 and the free piston 59 of the oil path 58 to provide the same actions as described above. Thus, the drive force is transmitted to the rear wheels 16 thereby establishing the four-wheel drive mode, and the braking torque to the rear wheels 16 is increased thereby preventing the front wheels 9 from locking.

Figure 3:
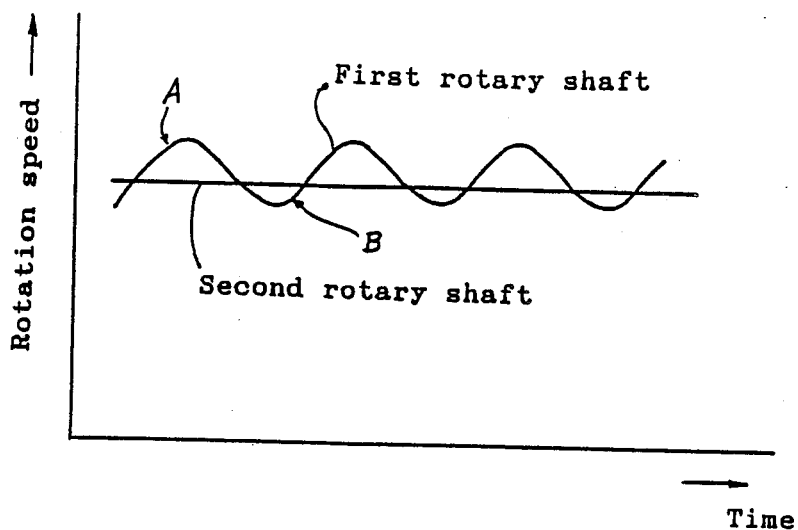
FIG. 3 and FIG. 4 are graphics showing the response of the power transmission apparatus for a vehicle of four-wheel drive type according to the present invention.

With the free piston 59, when a change in rotation speed due to a variation in torque of the engine 1 with a response as shown in FIG. 3 occurs in the front wheel drive system which is directly driven by the engine 1, that is, when the rotation speed of the first rotary shaft which drives the front wheels 9 is varied to be partly slower than the rotation speed of the second rotary shaft 14, and the relative rotational directions of the first and second rotary shafts cross each other, the following operation is performed.

When, as shown in part A in FIG. 3, the rotation speed of the first rotary shaft 11 is higher than that of the second rotary shaft 14, the rotor 19 rotates in the direction indicated by the arrow in FIG. 2, and hydraulic oil is supplied through the suction passage 51 and delivered through the delivery passage 53. This causes the drive force to be transmitted to the rear wheels 16 as described above. Further, when, as shown in part B in FIG. 3, the rotation speed of the first rotary shaft 11 is lower than that of the second rotary shaft 14, the rotor 19 rotates in the reverse direction of the arrow in FIG. 2, and hydraulic oil is supplied through the delivery passage 53 and delivered through the suction passage 51. In transition from the part A to the part B, hydraulic oil delivered into the suction passage 51 moves the piston 63 of the free piston 59 from the right to the left in FIG. 2 thereby retarding increase in delivery pressure of hydraulic oil temporarily. In transition from the part B to the part A, hydraulic oil delivered into the delivery passage 53 moves the piston 63 of the free piston 59 from the left to the right in FIG. 2 thereby retarding increase in delivery pressure of hydraulic oil temporarily.

Therefore, a change in torque due to a change in rotation speed of the first rotary shaft 11 is not transmitted to the second rotary shaft 14 if the change is within the moving range of the piston 63 of the free piston 59.

Figure 4:
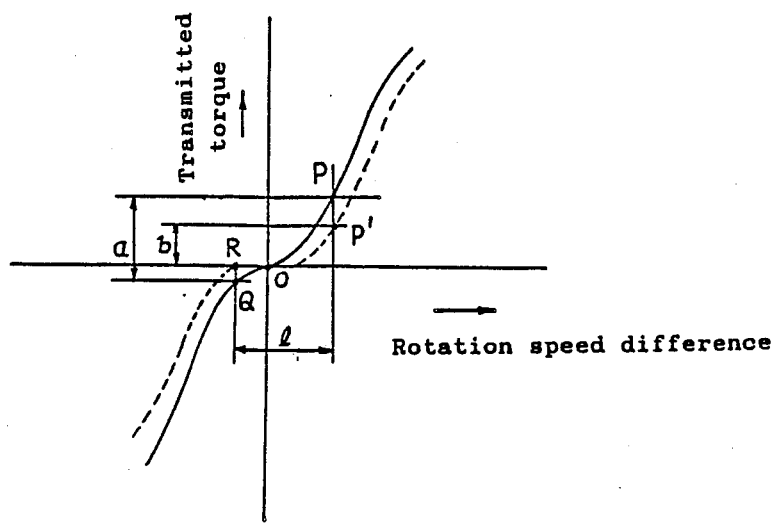

Thus, in the conventional art power transmission apparatus which is not provided with the free piston 59, when a change in rotation speed shown in FIG. 3 occurs, the torque transmitted to the second rotary shaft 14 has a response as shown in FIG. 4, and the rotation speed difference fluctuates within the range 1 (corresponding to the rotation speed difference shown in FIG. 3), both positive and negative torques indicated with a torque width a are transmitted moving between points O, P, and Q on the solid-line curve. In the power transmission apparatus according to the present invention which is provided with the free piston 59, only the positive torque indicated with a torque width b is transmitted moving between points O, P', and R on the broken-line curve, thereby preventing occurrence of hammering noise which occurs when a negative torque is transmitted to the second rotary shaft 14, and reducing unusual noises in the rear wheel drive system.

Further, by adequately setting the moving amount of the piston 63 of the free piston 59, a positive torque change can be absorbed, and transmission of a small change in torque due to a small variation in rotation speed of the first rotary shaft 11 can be completely prevented, thereby preventing occurrence of unusual noises and improving the durability of the rear wheel drive system.

In the above description, the free piston 59 is used as a common expansion chamber for the suction passage 51 and the delivery passage 53. However, alternatively, separate piston mechanisms which provide the same functions as the free piston 59 can be separately provided in the individual passages.

As described above in detail, with the power transmission apparatus for the vehicle of four-wheel drive type according to the present invention, a change in torque due to a variation in rotation speed of the first rotary shaft can be absorbed and prevented from being transmitted to the second rotary shaft by the function of the expansion chamber, thereby preventing occurrence of hammering noise in the rear wheel drive system connected to the second rotary shaft and improving the durability of the rear wheel drive system.

I claim:
1. In a power transmission apparatus for a vehicle of four-wheel drive type comprising:
a first rotary shaft for transmitting drive force to front wheels of the vehicle,
a second rotary shaft for transmitting drive force to rear wheels of the vehicle,
a hydraulic oil pump used as a connecting means for connecting said first and second rotary shafts and driven by a difference in rotational speed between said first and second rotary shafts to deliver hydraulic oil of an amount depending on said difference in rotational speed and having a suction passage and a delivery passage to be changed over in dependence on relative rotational direction of said first and second rotary shafts, restricting means for restricting communication between said suction passage and said delivery passage to restrict pressure of hydraulic oil delivered from said hydraulic oil pump;
the improvement comprising:
a cylinder having axial ends and a continuous imperforate axial wall, said cylinder communicating at one of its axial end with said suction passage and communicating at its opposite axial end with said delivery passage;
an imperforate piston slidably disposed inside said cylinder and dividing said cylinder into a first expansion chamber connected to said suction passage and a second expansion chamber connected to said delivery passage;
whereby, each of said chambers operate as an expansion chamber for reserving hydraulic oil to tempo- rarily suppress increases in pressure of hydraulic oil delivered from said hydraulic oil pump.

2. A power transmission apparatus for a vehicle of four-wheel drive type as claimed in claim 1, wherein one of said first and second rotary shafts is supplied with drive force directly from an engine and the other of said first and second rotary shafts is supplied with drive force through said hydraulic oil pump.

* * * * *